(12) United States Patent
Kopperud

(10) Patent No.: US 6,543,975 B2
(45) Date of Patent: Apr. 8, 2003

(54) HEIGHT ADJUSTMENT SYSTEM FOR TRUCK BED DIVIDER

(75) Inventor: Guy C. Kopperud, Racine, WI (US)

(73) Assignee: Loading Zone, LLC, Highland Park, IL (US)

( * ) Notice: Subject to any disclaimer, the term of this patent is extended or adjusted under 35 U.S.C. 154(b) by 0 days.

(21) Appl. No.: 09/839,193

(22) Filed: Apr. 19, 2001

(65) Prior Publication Data
US 2002/0187016 A1 Dec. 12, 2002

(51) Int. Cl.$^7$ ................................................ B60P 7/14
(52) U.S. Cl. ........................ 410/118; 410/129; 410/151
(58) Field of Search .............................. 410/121, 129, 410/151, 117, 118, 140; 296/24.1, 37.6; 220/529, 551; 224/42.33, 42.34

(56) References Cited

U.S. PATENT DOCUMENTS

| | | | |
|---|---|---|---|
| 2,565,997 A | 8/1951 | Stone | |
| 2,594,208 A | 4/1952 | Pilot | |
| 2,697,631 A | 12/1954 | Miller | |
| 3,699,898 A | * 10/1972 | Nolan | 410/121 |
| 3,782,758 A | 1/1974 | Williamson, II | |
| 3,995,565 A | * 12/1976 | Kersey | 410/151 |
| 4,215,895 A | 8/1980 | Phillips | |
| 4,236,854 A | * 12/1980 | Rogers | 410/121 |
| 4,343,578 A | * 8/1982 | Barnes | 410/151 |
| 4,396,325 A | 8/1983 | Joice-Cavanagh | 410/129 |
| 4,451,075 A | 5/1984 | Canfield | |
| 4,456,415 A | * 6/1984 | Joice-Cavanagh | 410/129 |
| 4,473,331 A | 9/1984 | Wisecarver | 410/129 |
| 4,507,033 A | 3/1985 | Boyd | 410/104 |
| 4,650,383 A | 3/1987 | Hoff | 410/149 |
| 4,733,899 A | 3/1988 | Keys | |
| 4,763,944 A | 8/1988 | Fry et al. | |
| 4,772,165 A | 9/1988 | Bartkus | 410/139 |
| 4,781,498 A | 11/1988 | Cox | 410/118 |
| 4,834,599 A | 5/1989 | Gordon et al. | 410/151 |
| 4,874,028 A | 10/1989 | Lynch et al. | |
| 4,875,730 A | 10/1989 | Justice | |
| 4,934,572 A | 6/1990 | Bowman et al. | |
| 4,961,677 A | 10/1990 | Downard, Jr. | 410/129 |
| 4,986,706 A | * 1/1991 | Williams, Jr. | 410/129 |
| 5,026,231 A | * 6/1991 | Moore | 410/118 |
| 5,028,185 A | 7/1991 | Shannon | 410/151 |
| 5,090,856 A | 2/1992 | Moore | 410/118 |
| 5,118,156 A | 6/1992 | Richard | |
| 5,147,103 A | 9/1992 | Ducote | |
| 5,186,587 A | * 2/1993 | Moore | 410/118 |
| 5,207,260 A | 5/1993 | Commesso | |
| 5,253,913 A | 10/1993 | Metivier | |
| 5,265,993 A | 11/1993 | Wayne | 410/129 |
| 5,411,355 A | 5/1995 | Gosnell et al. | 410/139 |
| 5,427,486 A | 6/1995 | Green | 410/118 |
| 5,443,586 A | 8/1995 | Cargill | 410/143 |
| 5,520,314 A | 5/1996 | Tkachuk | |
| 5,533,773 A | 7/1996 | Lessick | |
| 5,542,591 A | 8/1996 | Moore et al. | |

(List continued on next page.)

Primary Examiner—Stephen T. Gordon
(74) Attorney, Agent, or Firm—Boyle, Fredrickson, Newholm, Stein & Gratz, S.C.

(57) ABSTRACT

A foot assembly for use in adjusting the height of a truck bed divider. The foot assembly includes a body securable to a bottom rail of the truck bed divider that engages the bottom wall of the truck bed to assist in securing the divider within the truck bed. In order to adjust the height of the divider to accommodate truck beds including side walls of various heights, the foot assembly also includes one or more extensions that are releasably securable to the body of the foot assembly. The extensions serve to increase the overall height of the foot assembly so that the divider can be used with truck beds having higher side walls. The foot assembly and extensions are both formed of a resilient material that enables the foot assembly and/or extensions to frictionally engage the bottom wall of the truck bed to aid in securely positioning the divider within the truck bed.

8 Claims, 2 Drawing Sheets

U.S. PATENT DOCUMENTS

| | | | |
|---|---|---|---|
| 5,586,860 A | 12/1996 | Johnson | 410/138 |
| 5,685,470 A | 11/1997 | Moore | |
| 5,697,742 A * | 12/1997 | House | 410/127 |
| 5,769,580 A | 6/1998 | Purvis | 410/151 |
| 5,772,370 A | 6/1998 | Moore | 410/100 |
| 5,800,145 A | 9/1998 | Kelce | 410/142 |
| 5,820,187 A | 10/1998 | Ament et al. | |
| 5,845,953 A | 12/1998 | Rusnock | |
| 5,865,580 A | 2/1999 | Lawrence | 410/118 |
| 5,971,685 A * | 10/1999 | Owens | 410/151 |
| 5,975,819 A * | 11/1999 | Cola | 410/129 |
| 6,039,521 A | 3/2000 | Sullivan | 410/118 |
| 6,077,007 A | 6/2000 | Porter et al. | 410/140 |
| 6,089,803 A | 7/2000 | Holland | 410/129 |
| 6,089,804 A | 7/2000 | Bartelt | 410/140 |
| 6,099,222 A | 8/2000 | Moore | 410/100 |
| 6,174,116 B1 * | 1/2001 | Brand | 410/140 |

* cited by examiner

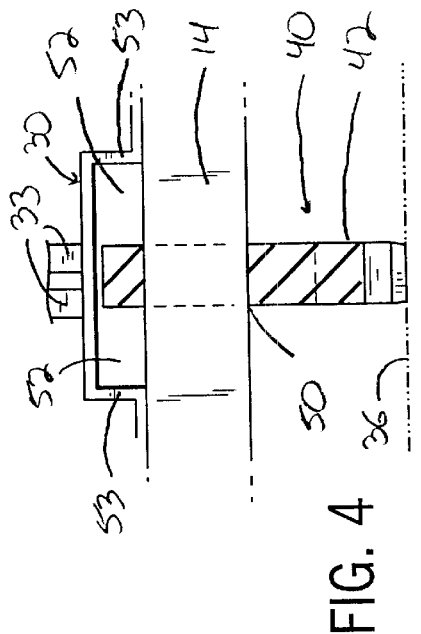
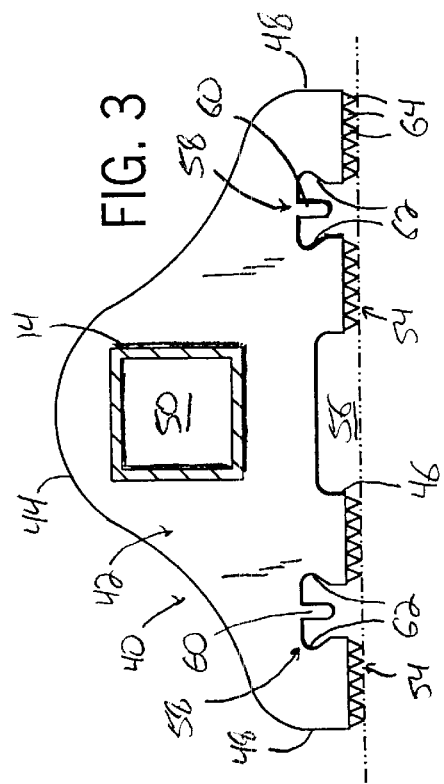
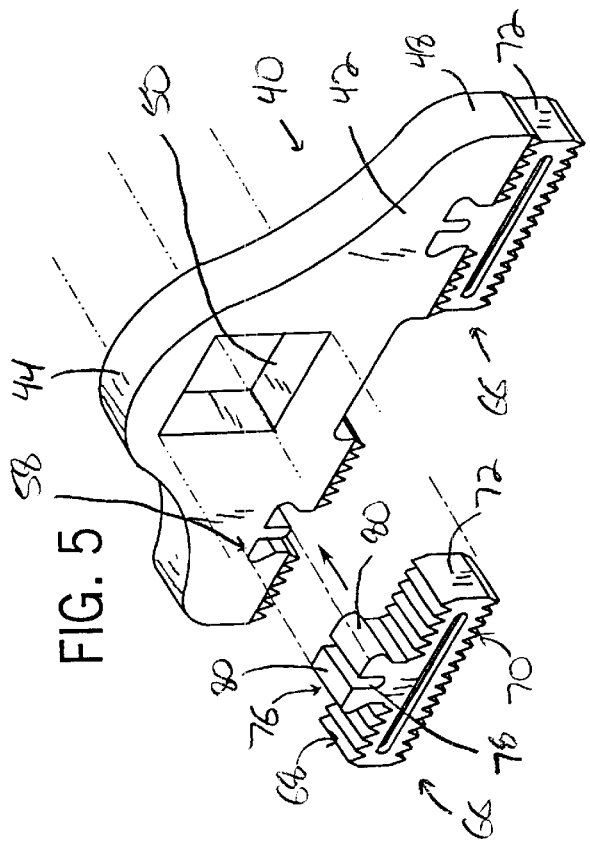
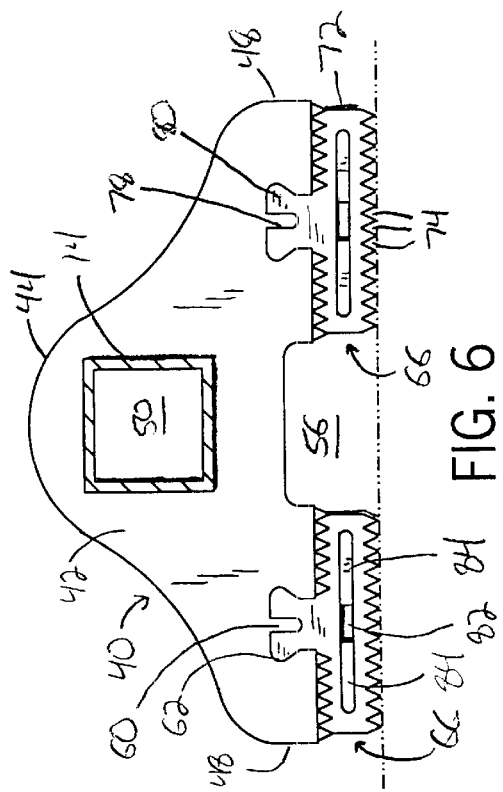

HEIGHT ADJUSTMENT SYSTEM FOR TRUCK BED DIVIDER

FIELD OF THE INVENTION

The present invention relates to truck bed dividers, and more specifically to a truck bed divider including a height adjustment system.

BACKGROUND OF THE INVENTION

Pickup trucks are often used to carry items from one place to another. The bed of the truck allows the items to be retained within the bed while the truck is moving. However, on many occasions, the items that are to be carried in the bed of the truck are not large enough to be securely retained within the truck bed by the walls of the bed without an additional securing structure.

As a result, a number of truck dividers have been developed that segregate the truck bed into sections that conform closely to the size of the items placed in the truck bed in order to more securely retain the items in the bed. These dividers generally include a rectangular panel or array of panels that extends across the truck bed between the side walls. The divider is secured to the side walls of the truck bed to maintain the divider in a stationary position while the truck is moving. Some dividers are designed to engage the bottom wall of the truck bed in order to retain the divider in a position perpendicular to the bottom wall while the truck is moving. This prevents the divider from swinging outwardly when contacted by one or more of the items retained by the divider, and allowing the items to slide beneath the divider, and possibly out of the truck bed.

Many truck bed dividers have been developed which utilize various configurations for segregating the interior of a truck bed. However, these truck bed dividers have each been designed for use with a specific type of pick-up truck. Therefore, the divider will most likely not be able to be utilized with a truck other than the specific type of truck for which the divider was designed. This presents many problems when the owner of a pick-up truck purchases a truck bed divider, as he or she must know the exact dimensions of the truck bed in order to find a truck bed divider which can be adequately secured within the interior of that particular truck bed. For example, on many occasions the feet attached to the bottom of a truck bed divider cannot adequately engage the bottom wall of a truck bed to prevent the divider from pivoting when in use. This is due to the fact that the height of the side walls of the truck bed may be greater than the height of the divider, which prevents the feet on the divider from properly engaging the truck bed. Alternatively, the divider may have a height greater than the truck bed, which prevents proper engagement of the divider latch mechanism with the side walls of the truck bed.

As a result, it is desirable to develop a truck bed divider including a height adjustment mechanism to accommodate for height differences in various truck beds.

SUMMARY OF THE INVENTION

It is an object of the present invention to provide a truck bed divider that includes an adjustable foot assembly capable of varying the overall height of the truck bed divider.

It is another objection of the invention to provide a foot assembly including a pair of extensions that are releasably attachable to the foot assembly in order to vary the height of the foot assembly and the divider.

It is still another object of the invention to provide a foot assembly capable of reliably securing the divider to the truck bed when using the foot assembly and the extensions, or the foot assembly alone.

It is still a further object of the invention to provide a foot assembly that is inexpensive to manufacture and easy to attach to a truck bed divider.

The present invention is an adjustable foot assembly for a truck bed divider used to vary the height of the divider depending upon the height of the truck bed in which the divider is positioned. The divider includes a panel having a generally rectangular shape that extends between the side walls of the truck bed. The panel includes a bottom edge or rail that is positioned slightly above, and extends along the bottom wall of the truck bed perpendicular to the side walls.

One or more resilient foot assemblies are attached to the bottom rail of the panel and contact the bottom wall of the truck bed to retain the panel in a position perpendicular to the side walls and bottom wall. Each foot assembly includes a body having an opening at one end that is adapted to engage the bottom rail of the panel. Opposite the opening, the foot assembly includes at least one bed engaging portion. Each bed engaging portion includes a number of grooves, knobs or other protrusions extending from the engaging portion that contact and frictionally engage the bottom wall of the truck bed in order to maintain the panel in a stationary position within the truck bed.

To adjust the height of the foot assembly to fit the height of a particular truck bed, the foot assembly also includes at least one extension that is releasably securable to the foot assembly. The extension is formed of a material similar to that used to form the body, and includes a securing means at one end and a bed engaging surface opposite the securing means. The securing means can be either a male or female portion of an interlocking mechanism for which the corresponding portion is disposed in the bed engaging portion of the body. The extension is engaged with the body such that the extension is disposed directly beneath the bed engaging portion of the body. In this configuration, the engaging surface of the extension contacts and engages the bottom wall of the truck bed in the same manner as the bed engaging portion on the body, while increasing the overall height of the foot assembly by the height of the extension.

Other objects and aspects of the invention will become apparent from the following drawings and detailed description.

BRIEF DESCRIPTION OF THE DRAWINGS

The following drawings illustrate the best mode currently contemplated of carrying out the present invention.

FIG. 3 is a partial cross-sectional view along line 3—3 of FIG. 2;

FIG. 4 is a partial cross-sectional view along line 4—4 of FIG. 2;

FIG. 5 is a partially exploded view of the foot assembly of FIG. 3 including the extensions attached to the foot assembly; and FIG. 6 is an elevation view of the foot assembly and extensions of FIG. 5 attached to a truck bed divider.

DETAILED DESCRIPTION OF THE INVENTION

Figure 1:
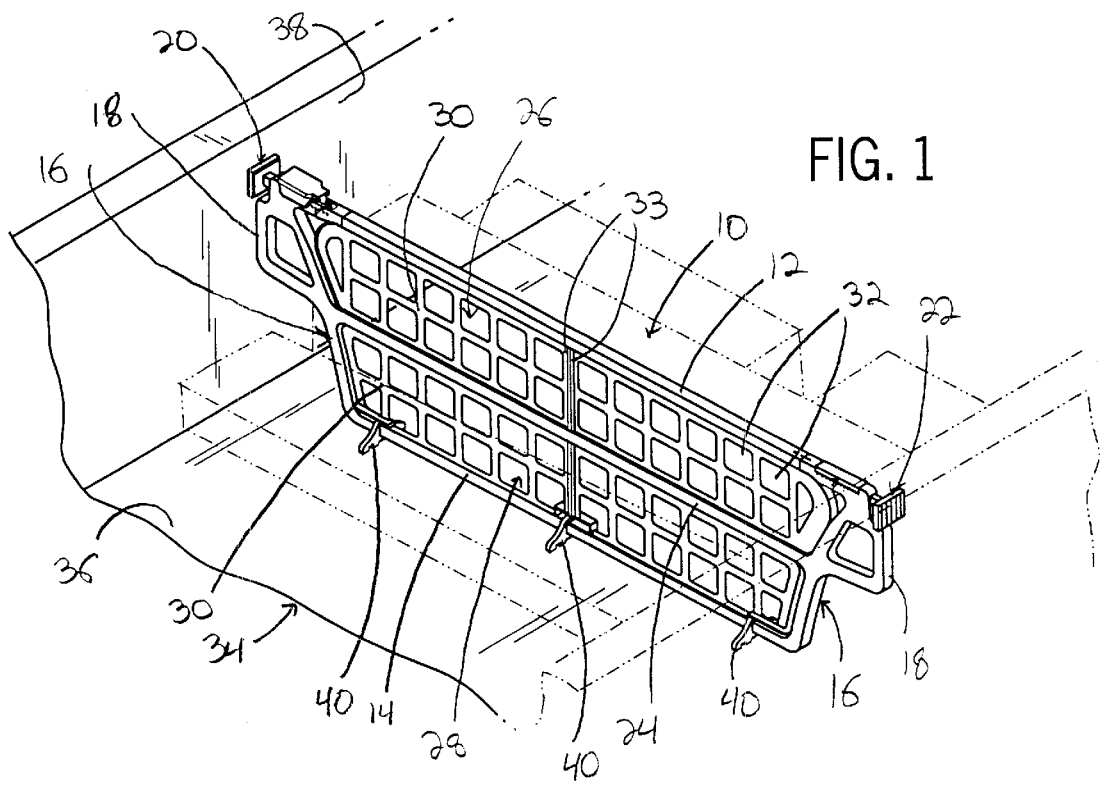
FIG. 1 is an isometric view of a truck bed divider including a number of the foot assemblies of the present invention.

With reference now to the drawing figures in which like reference numerals designate like parts throughout the disclosure, a truck bed divider is indicated generally at 10 in FIG. 1. The divider 10 is generally rectangular in shape and includes a top rail 12, a bottom rail 14, and a pair of side sections 16 connecting the top and bottom rails. The side sections 16 include outwardly extending shoulders 18 which provide clearance for wheel wells in the truck bed. Securing mechanisms 20, 22 are mounted to the upper ends of side sections 16, and may be an adjustable, extendible and retractable latch mechanism as shown and described in copending application Ser. No. 09/838,643, filed Apr. 19, 2001, the disclosure of which is hereby incorporated by reference.

The top rail 12 and bottom rail 14 are all hollow tubes formed of a rigid, lightweight material capable of handling a large amount of stress. Examples of suitable materials include thermosetting plastics and metals. Preferably, the tubes forming the top rail 12 and bottom rail 14 are generally square in cross-section and are formed of anodized aluminum. The side sections 16 are formed of a glass-filled nylon. The top and bottom rails 12, 14 are attached to the side sections 16 in a conventional manner to form the divider 10.

The divider 10 also includes a center rail 24 spaced between and extending parallel to the top rail 12 and bottom rail 14 between the side sections 16. The center rail 24 is formed similarly to the top and bottom rails 12, 14, and separates the divider 10 into an upper portion 26 and a lower portion 28. Both the upper portion 26 and lower portion 28 include a pair of web sections 30 disposed between the top rail 12 and center rail 24, and center rail 24 and bottom rail 14, respectively. The web sections 30 prevent any items secured by the divider 10 from passing through the upper portion 26 or lower portion 28 of the divider 10. The web sections 30 can be formed of either a flexible or rigid plastic material and include a number of apertures 32 to accommodate odd-shaped items and to reduce the overall weight and wind resistance of the divider 10. Each web section 30 also includes a support 33 positioned opposite the side sections 16 that extends between either the top rail 12 or the bottom rail 14 and the center rail 24 to maintain the web sections 30 in an upright position and to provide additional support to the divider 10.

Figure 2:
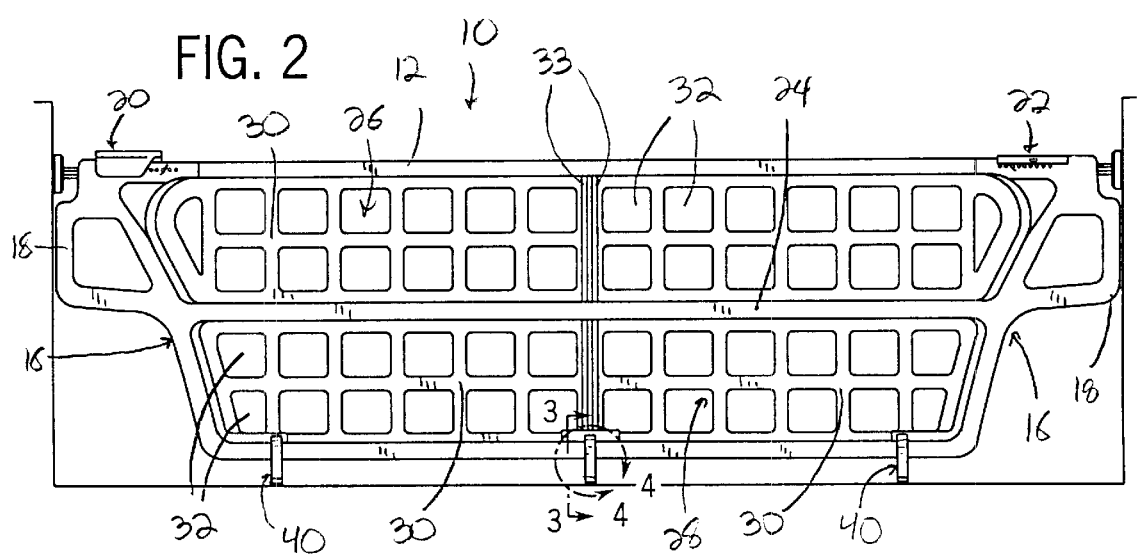
FIG. 2 is an elevation view of the truck bed divider and foot assemblies of FIG. 1.

Referring now to FIGS. 1 and 2, the divider 10 is positioned within a truck bed 34 including a bottom wall 36 and a pair of opposed side walls 38 extending upwardly from the bottom wall 36. In this position, the securing mechanisms 20 and 22 are engaged with the side walls 38 and the bottom rail 14 is spaced a distance above the bottom wall 36 of the truck bed 34 by a number of foot assemblies 40.

As best shown in FIGS. 3–4, each foot assembly 40 is connected to the bottom rail 14 and extends between the bottom rail 14 and the bottom wall 36. Further, each foot assembly 40 is formed of a generally resilient material having a high coefficient of friction that is capable of deforming slightly to accommodate variations of the particular structure of the bottom wall 36 of the truck bed 34, while retaining enough rigidity to adequately support the divider 10. The preferred material for the assemblies 40 is a hard rubber.

The foot assemblies 40 each have a body 42 including a generally convex upper surface 44 and a generally flat lower surface 46 joined to the upper surface 44 at each end by a pair of short side panels 48. The body 42 also includes a centrally-disposed opening 50 that extends completely through the body 42. The opening 50 is generally square in shape and is dimensioned to receive the bottom rail 14 of the divider 10. The opening 50 is dimensioned to be only slightly larger than the bottom rail 14 so that the body 42 does not easily slide with respect to the bottom rail 14. Further, as best shown in FIG. 4, the bottom rail 14 is inserted completely through the opening 50 in the body 42 of each foot assembly 40. When the lower pair of web sections 30 are joined to the bottom rail 14, the convex upper surface 44 of each foot assembly 40 extending over the bottom rail 14 passes through a recess 52 formed above the bottom rail 14 by notches 53 located at each end of the web sections 30. Foot assembly 40 can be moved within recess 52 to adjust the axial position of foot assembly 40 on bottom rail 14.

Opposite the convex upper surface 44, the flat lower surface 46 is separated into a pair of bed engaging sections 54 by a gap 56 disposed directly beneath the opening 50 and extending into the interior of the body 42. Each bed engaging section 54 includes a slot 58 also extending into the body 42 generally perpendicular to the lower surface 46. The slots 58 include a downwardly depending tongue 60 that divides the slot 58 into a pair of identical curved portions 62. Furthermore, on either side of the slots 58, each bed engaging section 54 includes a number of grooves 64 that extend laterally across the width of the lower surface 46. The grooves 64, as best shown in FIGS. 3 and 4, directly engage the bottom wall 36 of the truck bed 34 when the divider 10 is positioned within the truck bed 34.

However, when the height of the side walls 38 of the truck bed 34 is such that the height of the body 42 is insufficient to engage the bed engaging sections 54 with the bottom wall 36, a pair of extensions 66 can be secured to the bed engaging sections 54 on each body 42. As best shown in FIGS. 5 and 6, each extension 66 is generally rectangular in shape, including a top wall 68, a bottom wall 70, and a pair of side walls 72 joining the top and bottom walls. Both the top wall 68 and the bottom wall 70 include a plurality of grooves 74 that extend laterally across the width of the extension 66. The extensions 66 are also formed of a resilient material that is either similar to, or more flexible than the material used to form the body 42, such as a flexible rubber.

To attach each extension 66 to the corresponding bed engaging section 54, each extension 66 includes a tab 76 extending upwardly from the top wall 68. The tab 76 includes a channel 78 extending downwardly into the tab 76 that divides the tab 76 into a pair of curved sections 80. The curved sections 80 and channel 78 on the tab 76 correspond in shape to the tongue 60 and curved portions 62 within the slot 58 in each bed engaging section 54 such that the tab 76 is slidably engageable into the slot 58. Further, the grooves 74 disposed on the top wall 68 are aligned with the grooves 64 disposed on either side of the slot 58. Therefore, when the tab 76 is slidably inserted into the slot 58, the grooves 64 and 74, respectively, are also slidably engaged with one another to assist in holding the extension 66 together with the bed engaging section 54.

When the extensions 66 are secured to the bed engaging sections 54 on the body 42, each foot assembly 40 is increased in height by the height of the extension 66, not including the tab 76. Also, when the extension 66 engages the bottom wall 38 of the truck bed 36, the grooves 74 on the extension 66 opposite the tab 76 engage the bottom wall 38 in a manner identical to the grooves 64 on the bed engaging sections 54.

In order to provide additional flexibility for each foot assembly 40, each extension 66 also includes a central aperture 82 extending through each extension 66 between and parallel to the top wall 68 and bottom wall 70. A pair of inserts 84, which are formed of a more rigid material than the body 42 and extensions 66, are positioned within opposite sides of the aperture 82 in order to increase the rigidity of the extension 66 when positioned against the bottom wall 36. The inserts 84 can also be varied in length to change the additional amount of rigidity provided to the extensions 66, or inserts 84 may be omitted altogether.

While the previous description discloses the best mode of currently practicing the present invention, other alternative structures and configurations may also be used. For example, the grooves 64 and 74 on the respective surfaces and/or walls of the body 42 and extension 66 can be altered to other functionally equivalent structures, such as knobs and dimples, or tongues and grooves in order to align the extension 66 with the body 42 as well as grip the bottom wall 36 of the truck bed 34.

Further, the particular structures utilized to secure the extension 66 to the bed engaging sections 54 of the body 42 may comprise any functional equivalents of the slot 58 and tab 76 disposed on the body 42 and extension 66, respectively. For example, the structure used to secure the extension 66 to the body 42 could include a snap fastener, or a hook and loop fastener.

While the body 42 is disclosed as defining an opening 50 that is completely enclosed, it is also contemplated that the body 42 may include a depression, or a partially enclosed opening that is shaped to receive the bottom rail 14 of the divider 10. This opening may also include a means for securing the bottom rail 14 within the opening, such as a pair of opposed arms biased inwardly over the opening to enclose the opening, or a belt or strap releasably securable to opposite sides of the body 42 over the bottom rail 14 and through the recesses 52 defined by the web sections 34.

The invention has been shown and described as including a pair of extensions 66 engageable with each body 42. It should be understood that a single extension may be employed which extends outwardly in both directions from rail 14, or that any other number of extensions may be used.

Various alternatives are contemplated as being within the scope of the following claims particularly pointing out and distinctly claiming the subject matter regarded as the invention.

I claim:

1. An adjustable-height truck bed divider adapted to be positioned within a truck bed, the truck bed including a bottom wall and a pair of opposed side walls extending upwardly from the bottom wall, the divider comprising:

a panel including a bottom member;

at least one foot assembly secured to the bottom member and adapted to engage the bottom wall of the truck bed, the foot assembly including a body releasably secured to the bottom member and having at least one bed engaging portion opposite the bottom member; and at least one extension releasably secured to the at least one foot assembly, the extension including a securing means at one end and a bed engaging surface opposite the securing means.

2. The divider of claim 1 wherein the body includes an opening adapted to receive and enclose the bottom member to releasably secure the at least one foot assembly to the bottom member.

3. The divider of claim 1 wherein the bed engaging portion includes a plurality of grooves capable of frictionally engaging the bottom wall of the truck bed.

4. The divider of claim 1 wherein the at least one bed engaging portion includes one of either a male securing member or a female securing member and the securing means comprises the other of said male securing member or said female securing member.

5. The divider of claim 1 wherein the bed engaging surface includes a number of grooves adapted to frictionally engage the bottom wall of the truck bed.

6. The divider of claim 5 wherein the extension is made of a resilient material.

7. The divider of claim 1 wherein the at least one foot assembly includes a pair of bed engaging portions separated by a gap extending into the body of the at least one foot assembly.

8. The divider of claim 1 wherein that at least one foot assembly is made of a resilient material.

* * * * *